United States Patent Office 3,714,360
Patented Jan. 30, 1973

3,714,360
α - (BENZCYCLOALKYLPHENYL)-ALIPHATIC ACIDS AS ANTI-INFLAMMATORY AND HYPOCHOLESTEROLEMIC AGENTS
William Laszlo Bencze, New Providence, N.J., assignor to Ciba-Geigy Corporation, Ardsley, N.Y.
No Drawing. Filed Feb. 16, 1970, Ser. No. 11,889
Int. Cl. A61k 22/00
U.S. Cl. 424—317
2 Claims

ABSTRACT OF THE DISCLOSURE

α - [Benzcycloalk(en)ylphenyl] - aliphatic acids, e.g. those of the formula

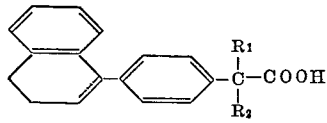

$R_1$ = H or alkyl
$R_2$ = H, alk(en)yl, cycloalk(en)yl or cycloalk(en)yl-alkyl and functional acid derivatives thereof are hypochloesterolemic and anti-inflammatory agents.

SUMMARY OF THE INVENTION

The present invention concerns and has for its object the provision of new α-[benzcycloalkyl- or -alkenylphenyl]-aliphatic acids, more particularly of those corresponding to Formula I

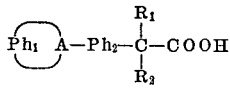

in which $Ph_1$ is a 1,2-phenylene radical, $Ph_2$ is a 1,2-, 1,3- or 1,4-phenylene radical, A is lower alkylene, lower alkenylene, mono- or dihydroxy-lower alkylene or lower alkanoylene forming with $Ph_1$ a 5 to 7 membered ring carrying $Ph_2$ at one ring-carbon atom thereof, $R_1$ is hydrogen or lower alkyl and $R_2$ is hydrogen, lower alkyl, lower alkenyl, 3 to 7 ring-membered cycloalkyl, cycloalkenyl, cycloalkyl-lower alkyl or cycloalkenyl-lower alky, of the therapeutically acceptable functional acid derivatives thereof, as well as of corresponding pharmaceutical compositions and of methods for the preparation and application of these products. Said compositions are useful hypochloesterolemic and anti-inflammatory agents in the treatment or management of hyperlipemia, arthritic and dermatopathologic conditions.

DESCRIPTION OF THE PREFERRED EMBODIMENT

The phenylene radicals $Ph_1$ and $Ph_2$ are unsubstituted or substituted in the remaining 3 or 4 positions respectively, by one or more than one, preferably one or two, of the same or different substituents selected, for example, from lower alkyl, e.g. methyl, ethyl, n- or i-propyl or -butyl, free, etherified or esterified hydroxy or mercapto, such as lower alkoxy or alkylmercapto, e.g. methoxy, ethoxy, n- or i-propoxy or -butoxy, methylmercapto or ethylmercapto, or halogeno, e.g. fluoro, chloro or bromo; trifluoromethyl, nitro or amino, preferably lower alkanoylamino, dilower alkylamino or lower alkyleneimino, e.g. acetylamino, dimethylamino or diethylamino, ethyleneimino, pyrrolidino or piperidino. The term "lower," referred to above and hereinafter in connection with organic radicals or compounds respectively, defines such with up to 7, preferably up to 4, carbon atoms.

More particularly, the phenylene radical $Ph_1$ represents above all 1,2-phenylene, but also (lower alkyl)-1,2-phenylene, (lower alkoxy)-1,2-phenylene, (halogeno)-1,2-phenylene or (trifluoromethyl)-1,2-phenylene and $Ph_2$ above all 1,4-phenylene, but also 1,3-phenylene, (lower alkyl)-1,3- or 1,4-phenylene, (lower alkoxy)-1,3- or 1,4-phenylene, (halogeno)-1,3- or 1,4-phenylene or (trifluoromethyl)-1,3- or 1,4-phenylene.

The trivalent aliphatic portion A is an unbranched or branched alkylene or alkenylene chain of preferably 3 to 7, especially 3 or 4 carbon atoms, which is connected with the $Ph_1$ moiety, preferably at both terminal carbon atoms thereof, and carries at one ring-carbon atom, preferably also a terminal carbon atom thereof, the $Ph_2$ moiety. Moreover, it may contain one or two hydroxy groups or one oxo group. Preferred A-moieties are those of the formulae:

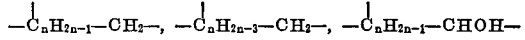
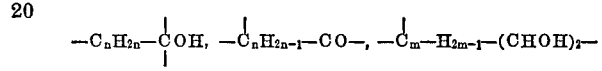

or

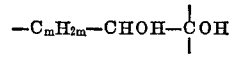

wherein $n$ is an integer from 2 to 7, preferably from 2 to 4, and $m = n-1$. Most preferred A-moieties are

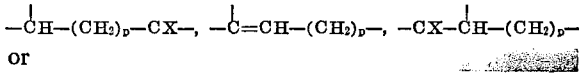

or

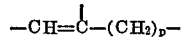

wherein X preferably represents two hydrogen atoms, but also hydrogen and hydroxy or oxo and $p$ is the integer 1 or preferably 2.

The lower alkyl radicals $R_1$ and/or $R_2$ represent preferably methyl, ethyl n- or i-propyl or -butyl. A lower alkenyl radical $R_2$ is, for example, vinyl, allyl, methallyl or 3-butenyl. A cycloalkyl or cycloalkenyl radical $R_2$ is preferably 3 to 6 ring-membered and represents above all cyclopropyl, but also cyclobutyl, cyclopentyl or cyclohexyl; 1- or 3-cyclopentenyl or -cyclohexenyl. A cycloalkyl-lower alkyl or cycloalkenyl-lower alkyl radical $R_2$ is one of the above-mentioned lower alkyl groups, preferably such with up to 4 carbon atoms, having in any position thereof, preferably at the terminal carbon atom, one of said cycloalkyl or cycloalkenyl radicals attached, e.g. cyclopropylmethyl, 2-cyclopentylethyl or 3-cyclopentenylmethyl.

Therapeutically acceptable functional derivatives of the acids of Formula I are preferably their esters, for example, their lower alkyl, lower alkenyl, 3 to 7 ring-membered cycloalkyl, cycloalkenyl, cycloalkyl-lower alkyl or cycloalkenyl-lower alkyl, aryl or aralkyl esters, e.g. the $HPh_1$- or $HPh_1$-lower alkyl esters, free or etherified hydroxy-lower alkyl esters, e.g. lower alkoxy- or 3 to 7 ring-membered cycloalkoxy-lower alkyl esters or tert. amino-lower alkyl esters, of which the esterifying moiety has been exemplified above and, if it contains heteroatoms, these are separated from the carboxy oxygen by at least 2 carbon atoms, preferably by 2 or 3 carbon atoms. A tertiary amino group therein is above all di-lower alkylamino, e.g. dimethylamino or diethylamino lower alkyleneimino, e.g. pyrrolidino or piperidino, or mono-azaoxa, or thia-lower alkyleneimino, such as piperazino, 3-lower alkyl-piperazino, e.g. 4-methyl- or 4-ethylpiperazino, morpholino or thiamorpholino. Other functional derivatives of the acids of Formula I are, for example, unsubstituted or substituted amides or thioamides, e.g. mono- or di-lower alkylamides, $HPh_1$-amides, HPh₁-lower alkylamides, lower alkyleneamides, monoaza-, monooxa- or monothia-lower alkyleneamides, furthermore the corresponding thioamides, hydroxamic acids, nitriles, ammonium or metal salts. Functional derivatives are also those of amino compounds, such as lower alkyl- or HPh₁-lower alkyl quaternaries and acid addition salts.

The compounds of the invention possess valuable pharmacological properties. Besides anti-inflammatory effects, they predominantly cause a reduction of the lipids in the blood, preferably of cholesterol and triglycerides. This can be demonstrated in in vitro or in vivo tests, using for the latter advantageously mammals, e.g. rats, dogs or monkeys, as test objects. The compounds of the invention can be administered orally, e.g. to male rats in the form of aqueous or polyethyleneglycol solutions or suspensions by stomach tube, or to male beagle dogs by gelatine capsules, for example in the dosage range between about 0.1 and 100 mg./kg./day, preferably between about 0.1 and 50 mg./kg./day, especially between about 1 and 25 mg./kg./day. The animals (rats) may either be on a standard or high cholesterol diet and serum total cholesterol is determined in orbital blood before and after treatment with the compounds of the invention. In addition, other serum constituents, e.g. glyceride-glycerol, are determined. Anti-inflammatory effects can be determined, for example in the carrageenin rat paw edema test. According to it, the compounds of the invention are applied, in the form of aqueous solutions or suspensions, by stomach tube to male and female mature rats, in the dosage range between about 1 and 100 mg./kg./day, preferably between about 10 and 75 mg./kg./day, advantageously between about 25 and 60 mg./kg./day. About 1 hour later 0.06 ml. of a 1% aqueous suspension of carrageenin is injected into the rat's left hind paw and 3 hours subsequently any anti-inflammatory activity can be expressed by the difference of the volume and/or weight of the edematous left paw and that of the right paw, as compared with said difference estimated from untreated control animals.

The compounds of the invention are, therefore, useful as hypolipidemic (hypocholesterolemic) agents bringing about an amelioration of certain syndromes, such as those caused by arteriorsclerosis, e.g. atherosclerosis and/or as antiinflammatory agents in the treatment or management of arthritic and dermatopathologic conditions. Furthermore, they can be used as intermediates in the preparation of other valuable products, particularly of pharmacologically active compounds.

Particularly useful are compounds of Formula I, in which $Ph_1$ is unsubstituted 1,2-phenylene, $Ph_2$ is unsubstituted 1,2-, 1,3- or 1,4-phenylene or $Ph_1$ and $Ph_2$ are such radicals substituted by one or two members selected from the group consisting of lower alkyl, hydroxy, mercapto, lower alkoxy, lower alkylmercapto, halogeno, trifluoromethyl, nitro, amino, lower alkanoylamino, di-lower alkylamino or lower alkyleneimino, A is lower alkylene, lower alkenylene, mono- or dihydroxy-lower alkylene or lower alkanoylene forming with $Ph_1$ a 5 to 7 membered ring carrying $Ph_2$ at one ring-carbon atom thereof, $R_1$ is hydrogen or lower alkyl, $R_2$ is hydrogen, lower alkyl, lower alkenyl, 3 to 7 ring-membered cycloalkyl, cycloalkenyl, cycloalkyl-lower alkyl or cycloalkenyl-lower alkyl, the lower alkyl, lower alkenyl, 3 to 7 ring-membered cycloalkyl, cycloalkenyl, (cycloalkyl, cycloalkenyl, HPh₁, hydroxy, lower alkoxy, cycloalkoxy, di-lower alkylamino, lower alkyleneimino or monoaza-, -oxa- or -thia-lower alkyleneimino)-lower alkyl or HPh₁-esters, the amide, thioamide, a mono- or di-lower alkylamide, HPh₁-amide, HPh₁-lower alkylamide, lower alkyleneamide, monoaza-, -oxa or -thia-lower alkyleneamide, wherein heteroatoms are separated from each other by at least 2 carbon atoms, the hydroxamic acid, nitrile, an ammonium or therapeutically useful metal, or acid addition salt thereof.

Preferred are those compounds of Formula I, in which $Ph_1$ is preferably 1,2-phenylene, but also (lower alkyl)-1,2 - phenylene, (lower alkoxy) - 1,2-phenylene, (halogeno) - 1,2 - phenylene or (trifluoromethyl) - 1,2-phenylene, $Ph_2$ is preferably 1,4 - phenylene, but also 1,3-phenylene, (lower alkyl)-1,3-or 1,4-phenylene, (lower alkoxy)-1,3- or 1,4-phenylene, (halogeno)-1,3- or 1,4-phenylene or (trifluoromethyl)-1,3- or 1,4-phenylene, A is one of the moieties

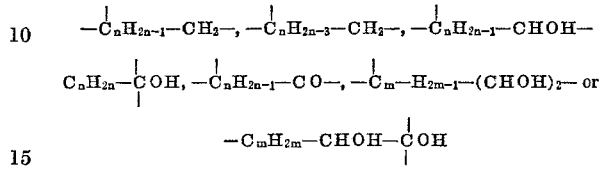

wherein n is an integer from 2 to 7, m is an integer from 1 to 6, $R_1$ is hydrogen or lower alkyl and $R_2$ is hydrogen, lower alkyl, lower alkenyl, 3 to 6 ring-membered cycloalkyl, cycloalkenyl, cycloalkyl-lower alkyl or cycloalkenyl-lower alkyl, a lower alkyl ester, ammonium, akali metal or alkaline earth metal salt thereof.

Outstanding compounds of the invention are those of Formula II

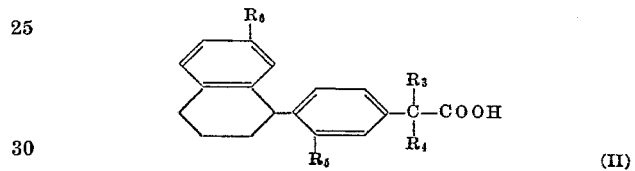

wherein $R_3$ is hydrogen or alkyl with up to 4 carbon atoms, $R_4$ is hydrogen, alkyl or cycloalkyl with up to 4 carbon atoms, and each of $R_5$ and $R_6$ is hydrogen, fluoro, chloro or trifluoromethyl, or their 1,2-dehydro derivatives or a lower alkyl ester, ammonium, or alkali metal salt thereof.

Especially valuable are compounds of Formula II, in which each of $R_3$ and $R_4$ is hydrogen or methyl, each of $R_5$ and $R_6$ is hydrogen or one thereof chlorine and the other hydrogen, or their 1,2-dehydro derivatives or the methyl ester, ethyl ester, ammonium, sodium or potassium salt thereof.

The compounds of the invention are prepared according to known methods, for example, by converting in a compound of Formula III

in which $X_1$ is a substituent capable of being converted into the free or functionally converted

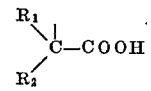

moiety, $X_1$ into said moiety and, if desired, converting any resulting compound into another compound of the invention.

According to the above process, the compounds of the invention are prepared either by (α) introduction of the whole free or functionally converted acid moiety

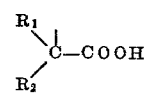

or any part thereof (preferably the carboxylic function), into compounds of Formula III, or by (β) liberation of said acid moiety from a suitable group containing already the required number of carbon atoms, i.e. the liberation of a potential carboxy or alkylidene moiety.

Accordingly, the simplest substituent $X_1$ is a hydrogen atom, a metallic group or a reactively esterified hydroxy group. The former is, for example, an alkali metal, e.g. a lithium atom, or a substituted alkaline earth metal, zinc or cadmium atom, such as halomagnesium or lower alkyl zinc or cadmium, e.g. chloro-, bromo- or iodomagnesium, methyl or ethyl zinc or cadmium. A reactively esterified hydroxy group is preferably such derived from a strong mineral or sulfonic acid, such as a hydrohalic, sulfuric, lower alkane or benzene sulfonic acid, e.g. hydrochloric, hydrobromic, methane-, ethane-, benzene- or p-toluenesulfonic acid. The corresponding starting material of Formula III is reacted with the acid having the formula

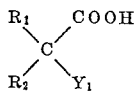

or a suitable derivative, e.g. a corresponding salt, ester, amide or nitrile thereof, in which formulae one of $X_1$ and $Y_1$ is the above-described metallic group and the other said reactively esterified hydroxy group, or $X_1$ is hydrogen and $Y_1$ is a free or reactively esterified hydroxy group. Such reaction is performed according to the classical Grignard or Friedel-Crafts syntheses, in which a new carbon-carbon bond is formed from separate reactants. The latter synthesis is performed in the presence of a Lewis acid, such as an aluminum, boron, antimony V, ferric or zinc salt, e.g. the chlorides thereof, or hydrofluoric, sulfuric or preferably polyphosphoric acid, which latter agent is advantageously used with the above glycolic acids or their derivatives, i.e. those in which $Y_1$ is hydroxy. In case $X_1$ is a hydrogen atom and Ph contains a free or functionally converted γ-carboxy-2-alkenyloxy group in the ortho or para position thereto, such allyl ether starting material, e.g. that of the formula

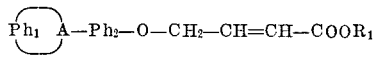

can be rearranged according to the Claisen (Cope) rearrangement procedure, for example, by heating it up to about 300° or less, to yield compounds of Formula I in which $R_2$ is lower alkenyl and $Ph_2$ contains a hydroxy group ortho or para to the acid moiety, or functional acid derivatives, e.g. esters or lactones, thereof.

The substituent $X_1$ in Formula III is also the group

in which $Y_2$ is a metallic group, e.g. such mentioned above, an ammonium group, such as tri-lower alkylammonium or di-lower alkyl-aralkylammonium, e.g. trimethylammonium or dimethylbenzylammonium, or a free or reactively converted, such as esterified, etherified or salified, hydroxy group, e.g. such esterified as mentioned above, or etherified with a lower alkanol or aralkanol, or salified with an alkali or alkaline earth metal, e.g. sodium, potassium or calcium. Such metal compound, ester, ether or alcoholate of Formula III is reacted with a reactive derivative of carbonic or formic acid, whereby both reactants at most contain one metal atom. The metal or Grignard compound can be reacted with any suitable, metal free carbonic or formic acid derivative, advantageously carbon dioxide or disulfide, but also a corresponding carbonate or haloformate, e.g. diethyl carbonate or thiocarbonate; ethyl or propyl orthocarbonate; ethyl, tert. butyl, allyl, 2-methoxyethyl, 3-chloropropyl, phenyl or benzyl chloroformate; cyanogen or carbamoyl halides, e.g. cyanogen bromide or diethylcarbamoyl chloride. The starting material, in which $Y_2$ is an ammonium or free or reactively converted hydroxy group, is advantageously reacted with a metal cyanide, e.g. sodium or potassium cyanide, and that in which $Y_2$ is free, esterified or salified hydroxy, or the dehydrated unsaturated derivative thereof (wherein $X_1$ is a corresponding 1-alkenyl group), can also be reacted with carbon monoxide. The latter may be applied under neutral, basic or acidic conditions respectively, e.g. in the presence of sulfuric acid, under high pressure and/or temperature, e.g. up to 400 atm. and 300°, advantageously in the presence of heavy metal catalysts, e.g. nickel or cobalt salts or carbonyl derivatives thereof. The carbon monoxide may also be generated from appropriate sources, such as formic acid and high boiling mineral acids, e.g. sulfuric or phosphoric acid.

Another substituent $X_1$ is the group

wherein $Y_3$ is a substituent convertible into a free or functionally converted carboxy group. The conversion of $Y_3$ into the latter group can be performed either by oxidation or rearrangement. In the former case $Y_3$ is, for example, methyl, hydroxymethyl, borylmethyl, hydroxyiminomethyl, formyl, lower 1-alkenyl or 1-alkynyl, lower 1,2-dihydroxyalkyl or acyl, such as lower alkanoyl, alkenoyl, free or esterified carboxycarbonyl. In the corresponding starting material of Formula III, containing said potential carboxy function, $Y_3$ is transformed into free or functionally converted carboxy according to standard oxidation methods, for example, with the use of air or pure oxygen, preferably in the presence of catalysts, such as silver, manganese, iron or cobalt catalysts, or with oxidation agents, e.g. hydrogen peroxide or nitric oxides, oxidizing acids or their salts, such as hypohalous, periodic, nitric or percarboxylic acids or suitable salts thereof, e.g. sodium hypochlorite or periodate, peracetic, perbenzoic or monoperphthalic acid, heavy metal salts or oxides, such as alkali metal chromates or permanganates; chromic or cupric salts, e.g. halides or sulfates thereof, or silver, mercuric, vanadium V, chromium VI or manganese IV oxide, in acidic or alkaline media respectively. In said oxidations, usually the free carboxylic acids of Formula I, or salts thereof, are obtained. However, by subjecting, for example, a hydroxyiminomethyl compound (oxime) to Beckmann rearrangement, e.g. treatment with sulfuric acid, p-toluenesulfonyl chloride or phosphorus pentachloride, or to oxidation, e.g. with hydrogen peroxide or any of said percarboxylic acids, or reacting the corresponding formyl or acyl compound (aldehyde or ketone) with hydrazoic acid according to the Schmidt reaction, e.g. in the presence of sulfuric acid, or the aldehyde with a sulfonyl- or nitro-hydroxamate, a nitrile, amide or hydroxamic acid will be formed respectively. A starting material in which $Y_3$ is free or esterified carboxycarbonyl, e.g. lower carbalkoxycarbonyl, can be converted into the acid of Formula I either by oxidation, e.g. with hydrogen peroxide in acidic media, such as mineral acids, or by decarbonylation, which preferably is carried out by pyrolysis, advantageously in the presence of copper or glass powder.

Finally, the substituent $X_1$ in Formula III may be such a moiety, which primarily is capable of liberating the required alkylidene group

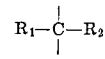

Such moiety is, for example, the free or functionally converted group

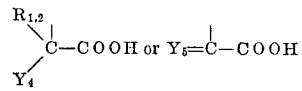

wherein each of $Y_4$ or $Y_5$ are convertible into $R_1$ and/or $R_2$ respectively, for example, by reduction, decarboxylation, deacylation or desulfurization. For example, $Y_4$ is a free or reactively esterified or etherified hydroxy or mercapto group as mentioned above, e.g. hydroxy, mercapto, chloro, bromo, iodo, benzyloxy or benzylmercapto, and $Y_5$ a lower alkylidene, cycloalkylidene, cycloalkyl-alkylidene, oxo or thiono group. The corresponding starting material can be reduced either with catalytically activated or nascent hydrogen, such as hydrogen in the presence of nickel, palladium or platinum catalysts, or with hydrogen generated by electrolysis or the action of metals on acids, alkalis or alcohols, such as zinc, amalgamated zinc, iron or tin on aqueous mineral or carboxylic acids, e.g. hydrochloric or acetic acid, zinc or aluminum-nickel alloys on aqueous alkali metal hdyroxides, or sodium, potassium or their amalgams on lower alkanols. Also reducing and/or desulfurizing agents may be applied, depending on the starting material chosen. In case $Y_4$ is hydroxy, the reducing agent may be an aqueous suspension of phosphorus and iodine, hydriodic acid, stannous chloride or sodium sulfite or dithionite, or in case $Y_4$ is esterified hydroxy, e.g. halogeno, an aliphatic or cycloaliphatic metal compound, e.g. a corresponding $R_1$ or $R_2$ lithium or Grignard compound may be used as reducing agent. In case $Y_5$ is oxo, the Clemmensen, Wolff-Kishner or Huang-Minlon procedures may be applied, wherein nascent hydrogen or hydrazine are used, the latter advantageously in the presence of strong alkalis, e.g. high boiling aqueous or glycolic sodium or potassium hydroxide solutions. In the reduction of mercapto, free or ketalized thiono compounds, desulfurization agents are advantageously applied, such as mercuric or copper oxide or Raney nickel. In case $Y_4$ represents carboxy, the corresponding malonic acid derivative is decarboxylated by pyrolysis, advantageously in acidic media, or $Y_4$ stands for another acyl radical, such as lower alkanoyl or aralkanoyl, e.g. acetyl or benzoyl, the β-keto acid is subjected to acid splitting by the action of strong alkalis, e.g. those mentioned above.

Another substituent $X_1$, also providing said alkylidene group, is an unsubstituted or substituted acetyl group, e.g.

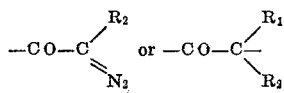

halogen. The corresponding unsubstituted acetyl starting material is converted into the compounds of the invention according to the Willgerodt-Kindler reaction, e.g. by the action of sulfur in the presence of ammonia, primary or secondary amines and advantageously of sulfonic acids, e.g. p-toluene sulfonic acid, and said substituted acetyl compounds according to the Wolff (Arndt-Eistert) reaction, e.g. by hydrolysis, alcoholysis, ammonolysis or aminolysis of corresponding α-diazo-ketones, advantageously while irradiated or heated in the presence of copper or silver catalysts, or according to the Favorskii (Wallach) reaction respectively, e.g. by the action of strong alkalis or soluble silver salts, such as silver nitrate, or corresponding α-haloketones.

The compounds of the invention so obtained can be converted into each other according to methods known per se. For example, resulting free acids may be esterified with the corresponding alcohols in the presence of a strong acid, e.g. hydrochloric, sulfuric, benzene or p-toluene sulfonic acid, or with diazo compounds, or converted into their halides by treatment with thionyl halides or phosphorus halides or oxyhalides. Resulting esters may be hydrolyzed or transesterified in the presence of acidic or alkaline agents, e.g. mineral or complex heavy metal acids or alkali metal carbonates or alcoholates, or treated with ammonia or corresponding amines. Resulting acid halides may be treated with alcohols, ammonia or amines and resulting metal or ammonium salts with aliphatic or araliphatic halides or chlorosulfites, thionyl halides, phosphorus oxide, sulfide, halides or oxyhalides or other acyl halides, in order to obtain the corresponding esters, halides, anhydrides, amides, thioamides or the nitrile respectively. Resulting amides or thiomides (Willgerodt) can be hydrolyzed under acidic or alkaline conditions, e.g. with the use of aqueous mineral and/or carboxylic acids or alkali metal hydroxides; alcoholized, transaminated or desulfurized, e.g. with the use of mercuric oxide or alkyl halides followed by hydrolysis. Resulting nitriles likewise can be hydrolyzed or alcoholized, e.g. with the use of concentrated aqueous or alcoholic acids or alkalis, or alkaline hydrogen peroxide. A resulting ester, salt or nitrile, containing in α-position at least one hydrogen atom, can be metallized therein, e.g. with the use of alkali metals or their derivatives, such as phenyl lithium, triphenylmethyl sodium or sodium hydride, amides or alcoholates, and thereupon reacted with reactive esters of $R_1$—OH and/or $R_2$—OH. Resulting compounds may also be halogenated in the Ph-moiety, e.g. with the use of halogens, which are advantageously applied in the presence of Lewis acids, e.g. ferric, aluminum, antimony III or tin IV halides, or with the use of halogenation agents, e.g. hydrochloric acid and hydrogen peroxide or sodium chlorate, nitrosyl chloride or bromide, bromosuccin- or phthalimide. Furthermore, nitration may be applied to final products, advantageously with the use of nitric acid or nitrates under acidic condition, e.g. in the presence of sulfuric or trifluoroacetic acid respectively. Resulting nitro compounds may be reduced, for example, with catalytically activated or nascent hydrogen and, if desired, the primary amino compounds obtained, either treated with reactive esters of corresponding alcohols or glycols, or with reactive functional acid derivatives, in order to obtain secondary, tertiary, quaternary or acylated amino compounds respectively. Said prim. amines can also be treated with nitrous acid, to yield diazonium salts, which latter can be converted according to the Sandmeyer reaction, into the corresponding hydroxy, halogeno, cyano, alkoxy or alkylmercapto compounds, e.g. by hydrolyzing the diazonium salt at elevated temperatures, or reacting it with cuprous halides or cyanide, or with a lower alkanol or alkylmercaptan respectively, preferably under neutral or slightly acidic or alkaline conditions. In resulting phenolic products, the hydroxy or mercapto group can be etherified, e.g. by reacting the corresponding alkali metal phenolates with lower alkyl, e.g. methyl halides or sulfonates, or resulting phenol ethers are hydrolyzed, e.g. with the use of strong acids or acidic salts, e.g. hydrobromic and acetic acid or pyridine hydrochloride. Resulting hydrogenated compounds may be fully or partially dehydrogenated by the treatment with palladium, sulfur, selenium or selenium dioxide, advantageously in high-boiling diluents, e.g. xylene or diphenyl ether, or resulting unsaturated compounds fully or partially hydrogenated by the controlled uptake of catalytically activated hydrogen, which usually enters unsubstituted aromatic moieties easier than the substituted, e.g. halogenated, moieties.

A resulting acid can be converted into its salts according to conventional methods, for example, by reacting it with an about stoichiometric amount of a suitable salt-forming reagent, such as ammonia, an amine or an alkali or alkaline earth metal hydroxide, carbonate or hydrogen carbonate. A salt of this type can be reconverted into the free acid by treatment with an acid, e.g. hydrochloric, sulfuric or acetic acid. A resulting compound containing a basic group, such as an amino group, can be converted into a corresponding acid addition salt, for example by reacting it with an inorganic or organic acid, such as a therapeutically useful acid, or with a corresponding anion exchange preparation, and isolating the desired salt. An acid addition salt may be converted into the free compound by treatment with a base, e.g. a metal hydroxide, ammonia or a hydroxyl ion exchange preparation. Therapeutically useful acids are, for example, inorganic acids, e.g. hydrochloric, hydrobromic, sulfuric, phosphoric, nitric or perchloric acid, or organic acids, e.g. carboxylic or sulfonic acids, such as formic, acetic, propionic, succinic, glycollic, lactic, malic, tartaric, citric, ascorbic, maleic, hydroxymaleic, pyroracemic phenylacetic, benzoic, 4-amino-benzoic, anthranilic, 4-hydroxybenzoic, salicylic, aminosalicylic, embonic, nicotinic, methanesulsulfonic, ethanesulfonic, hydroxyethanesulfonic, ethylenesulfonic, benzenesulfonic, halogenbenzenesulfonic, toluenesulfonic, naphthalenesulfonic and sulfanilic acid; methionine, tryptophan, lysine or arginine.

These or other salts, for example, the picrates, can also be used for purification purposes. The free compounds are converted into salts, the salts are separated and the free compounds liberated from the salts. In view of the close relationship between the free compounds and their salts, whenever a free compound is referred to in this context, a corresponding salt is also intended, provided such is possible or appropriate under the circumstances.

Resulting mixtures of isomers can be separated into the single isomers by methods in themselves known, e.g. by fractional distillation, crystallization and/or chromatography. Racemic products can likewise be resolved into the optical antipodes, for example by separation of diastereomeric salts thereof, e.g. by the fractional crystallization of the d-$\alpha$-(1-naphthyl)-ethylamine or 1-cinchonidine salts.

The above reactions are carried out according to standard methods, in the presence or absence of diluents, preferably such as are inert to the reagents and are solvents thereof, of catalysts, condensing or neutralizing agents and/or inert atmospheres, at low temperatures, room temperature or advantageously elevated temperatures, at atmospheric or superatmospheric pressure.

The invention also comprises any modification of the above process, wherein a compound resulting as an intermediate at any stage thereof, is used as starting material and the remaining steps are carried out or the process is discontinued at any stage thereof, or in which the starting material is formed under the reaction conditions or is used in the form of its salts or reactive derivatives. For example, in most of the above described oxidation methods, wherein $Y_3$ is converted into a free or functionally converted carboxy group, the corresponding aldehydes ($Y_3$ is formyl) are formed intermediarily. According to the haloform reaction ($Y_3$ is acetyl) intermediarily formed trihaloketones are hydrolyzed under the applied alkaline conditions, to yield the corresponding salts or esters of the acids of Formula I. The $\alpha$-diazoketones are usually formed, according to Arndt-Eistert, from the corresponding benzoic acid halides and aliphatic or cycloaliphatic ($R_2$) diazo compounds, whereupon the above-described Wolff rearrangement is performed. In the process of the invention those starting materials are preferably used, which yield the above-described preferred embodiments of the invention.

The starting material used is known or, if new, may be prepared according to methods known per se. For example, the compounds of Formula III are advantageously prepared from compounds of the formula

wherein A is lower alkanoylene, e.g. $\alpha$- or $\beta$-tetralone, and $X_1$—$Ph_2$-Grignard compounds, to yield compounds of Formula III, wherein A is lower hydroxyalkylene. Such compounds can be dehydrated, for example, by heating them in acidic media, e.g. concentrated hydrochloric acid, to yield compounds of Formula III, wherein A is lower alkenylene. Said unsaturated compounds can be hydrogenated to the corresponding saturated compounds, for example, with the aid of palladium catalysts. Resulting compounds of Formula III, wherein $X_1$ is a reactively esterified hydroxy group (which may also be introduced either by halogenation, or nitration followed by reduction, diazotization and Sandmeyer reaction), can be converted into the metallic compounds, e.g. hydroxyalkylene. Such compounds can be dehydrated, for example, by heating them in acidic media, e.g. concentrated hydrochloric acid, to yield compounds of Formula III, wherein A is lower alkenylene. Said unsaturated compounds can be hydrogenated to the corresponding saturated compounds, for example, with the aid of palladium catalysts. Resulting compounds of Formula III, wherein $X_1$ is a reactively esterified hydroxy group (which may also be introduced either by halogenatian, or nitration followed by reduction, diazotization and Sandmeyer reaction), can be converted into the metallic compounds, e.g. by reaction with alkali or alkaline earth metals, such as lithium or magnesium, or with dialkyl zinc or cadmium. The allyl ethers for the Claisen rearrangement can be prepared analogous to those described in J. Chem. Soc. 4210 (1963).

The starting material in which $Y_2$ is a metallic group may be prepared as shown above, i.e. by reacting reactive esters of the corresponding benzylalcohols with alkali or alkaline earth metals or dialkyl zinc or cadmium. Otherwise, the resulting compound of Formula III, wherein $X_1$ is hydrogen, can be acylated according to Friedel-Crafts, e.g. with the use of $R_2$—COCl or phosgene and aluminum chloride, or any halogenated compound is converted into the corresponding Grignard compound, which can be reacted with aliphatic or cycloaliphatic aldehydes or ketones, to yield the corresponding alcohols. The hydroxy group thereof may be reactively esterified or salified according to well-known methods, e.g. by reaction with phosphorus, thionyl or sulfonyl halides, alkali or alkaline earth metals respectively and the resulting esters or salts may be converted into ethers either by reaction with alcoholates or reactive esters respectively. The compounds in which $Y_2$ is an ammonium group, can be obtained from the former reactive esters and secondary amines and the resulting tertiary amines are quaternized in the usual manner, e.g. by reaction with lower alkyl or aralkyl halides.

The starting material containing $Y_3$ can be obtained from the former compounds in which $Y_2$ is a metallic group, by reacting them with a methyl halide, formaldehyde, a formyl halide, lower alkanal, alkenal or hydroxyalkanal or a lower alkanoyl, alkenoyl or oxalyl halide respectively and, if desired, dehydrating resulting alcohols by the action of acidic agents, e.g. sulfuric acid or phosphorus pentoxide, to yield unsaturated derivatives thereof. The latter, e.g. methylidene compounds, may be reacted with boranes in order to obtain borylmethyl compounds and aldehydes with hydroxylamine, to yield the hydroxyiminomethyl compounds (oximes). The aldehydes, i.e. compounds in which $Y_3$ is formyl, can also be obtained from the above-mentioned ketones, i.e. those of Formula III in which $X_1$ is —CO—$R_2$, by reaction with dimethylsulfoniummethylide or dimethyloxysulfoniummethylide (generated from the corresponding trimethylsulfonium salts) and rearranging the resulting ethyleneoxides to the corresponding aldehydes by the action of Lewis acids, e.g. p-toluene sulfonic acid or boron trifluoride, or according to the Darzens condensation by reacting the above ketones with $\alpha$-halo-alkanoic or alkenoic acid esters in the presence of alcoholates, e.g. potassium tert. butoxide, saponifying the glycidic esters formed and rearranging and decarboxylating them, advantageously in acidic media, e.g. sulfuric acid.

The starting material containing $Y_4$, which represents free, esterified or etherified hydroxy or mercapto, can be prepared according to the cyanohydrin or analog syntheses, e.g. by reaction of said ketones or their thiono analogs, with aqueous potassium cyanide under acidic conditions and, if desired, converting resulting nitriles into other acid derivatives and/or alcohols into corresponding mercapto compounds or reactive esters or ethers thereof, or dehydrating them to unsaturated derivatives. The compounds in which $Y_5$ is oxo or thiono can be obtained according to Friedel-Crafts with the use of suitable compounds of Formula III, wherein $X_1$ is hydrogen and oxalyl halides. The resulting phenylglyoxylic acid esters may then be reduced with $R_2$-Grignard compounds, if desired, followed by dehydration. Said compounds may also be prepared according to the Ando synthesis by reaction with mesoxalates in the presence of stannic chloride. The resulting adduct can either be hydrogenated, the malonate formed metallized and reacted with a reactive ester of $R_2$—OH or saponified and decarboxylated. Finally the α-diazoketones are obtained from corresponding benzoic acid halides and $R_2$-diazo compounds and the α-haloketones by halogenating of the corresponding ketones or reacting the former α-diazoketones with hydrohalic acids.

The pharmacologically active compounds of the invention are useful in the manufacture of pharmaceutical compositions containing an effective amount thereof in conjunction or admixture with excipients suitable for either enteral, parenteral or topical application. Preferred are tablets and gelatin capsules comprising the active ingredient together with (a) diluents, e.g. lactose, dextrose, sucrose, mannitol, sorbitol, cellulose and/or glycine, (b) lubricants, e.g. silica, talcum, stearic acid, its magnesium or calcium salt and/or polyethyleneglycol, for tablets also, (c) binders, e.g. magnesium aluminum silicate, starch paste, gelatin, tragacanth, methylcellulose, sodium carboxymethylcellulose and/or polyvinylpyrrolidone, if desired, (d) disintegrants, e.g. starches, agar, alginic acid or its sodium salt, enzymes of the binders or effervescent mixtures and/or (e) adsorbents, colorants, flavors and sweeteners. Injectable compositions are preferably aqueous isotonic solutions or suspensions, and suppositories or ointments are advantageously fatty emulsions or suspensions. They may be sterilized and/or contain adjuvants, such as preserving, stabilizing, wetting or emulsifying agents, solution promoters, salts for regulating the osmotic pressure and/or buffers. Said pharmaceutical compositions may also contain other therapeutically valuable substances. They are prepared according to conventional mixing, granulating or coating methods respectively and contain about 0.1 to 75%, preferably about 1 to 50% of the active ingredient.

The following examples are intended to illustrate the invention and are not to be construed as being limitations thereon. Temperatures are given in degrees Centigrade, and all parts wherever given are parts by weight.

EXAMPLE 1

The mixture of 20.4 g. 1-[4-(1,2,3,4-tetrahydro-1-naphthyl)-phenyl]-ethyl chloride, 58 ml. dimethylsulfoxide and 3.8 g. sodium cyanide is stirred at 65° for 8 hours. It is poured into water, the mixture extracted with diethyl ether, the extract washed with water and brine, filtered and evaporated in vacuo. The residue is taken up in benzene, the solution passed through a short column with 100 g. aluminum oxide (neutral, Activity III), the eluate evaporated, the residue distilled and the fraction boiling at 170–180°/0.25 mm. Hg collected, to yield the α - [4 - (1,2,3,4 - tetrahydro - 1 - naphthyl)-phenyl]-propionitrile of the formula

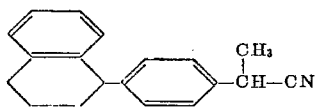

showing in the IR-spectrum a strong band at 2230 cm.$^{-1}$.

The starting material is prepared as follows: The solution of 114.9 g. 4 - chloro - bromobenzene in 300 ml. diethyl ether is slowly added to the suspension 14.4 g. magnesium in 75 ml. diethyl ether while stirring and cooling. After the reaction subsides, the mixture is refluxed for 2 hours, during which time most of the magnesium is consumed. The mixture is cooled in an ice bath and 72.9 g. α-tetralone in 300 ml. benzene-diethyl ether (1:1) are added slowly and the mixture refluxed for 3 hours. It is poured onto ice and concentrated hydrochloric acid, the mixture extracted with diethyl ether, the extract washed with water and brine, filtered and the filtrate evaporated in vacuo. The residue is taken up in 600 ml. concentrated hydrochloric acid, the mixture refluxed for 90 minutes, cooled, the precipitate formed filtered off and recrystallized from aqueous ethanol, to yield the 1-(4-chlorophenyl)-3,4-dihydronaphthalene melting at 96–98°.

The solution of 79 g. thereof in 800 ml. glacial acetic acid is hydrogenated over 6 g. 10% palladium on charcoal at 60° and 3 atm., until the theoretical amount of hydrogen has been absorbed. The mixture is filtered, the filtrate evaporated in vacuo, the residue taken up in water and the mixture extracted with diethyl ether. The extract is washed with water and aqueous sodium bicarbonate, filtered, evaporated, the residue distilled and the fraction boiling at 122–130°/0.2 mm. Hg collected, to yield the 1-(4-chlorophenyl)-1,2,3,4-tetrahydronaphthalene.

The solution of 38 g. thereof in 36 ml. tetrahydrofuran, 0.22 ml. 1,2-dichloroethane and 0.28 ml. methyl iodide, is added to the suspension of 4.9 g. magnesium in 20 ml. tetrahydrofuran while stirring under nitrogen. The mixture is refluxed for 16 hours, during which time it is diluted with 50 ml. tetrahydrofuran. It is cooled in an ice bath, the solution of 5.7 g. acetaldehyde in 20 ml. tetrahydrofuran is added dropwise during 90 minutes and the mixture refluxed for an hour. It is poured onto ice and concentrated hydrochloric acid, the mixture concentrated in vacuo, the aqueous concentrate extracted with diethyl ether, the extract washed with water and aqueous sodium bicarbonate, dried, filtered and evaporated in vacuo. The residue is distilled and the fraction boiling at 162–175°/0.2 mm. Hg collected, to yield the 1-[4-(1,2,3,4-tetrahydro-1-naphthyl)-phenyl]-ethanol, showing in the IR-spectrum bands at 740, 820 and 3370 cm.$^{-1}$. (A sample of it is oxidized with chromium trioxide, to yield the 4-(1,2,3,4-tetrahydro-1-naphthyl)-acetophenone, melting at 54–56° and the oxime thereof melts at 154–155.5°.)

The mixture of 21.9 g. thereof, 165 ml. benzene and 46 ml. thionyl chloride is refluxed for 6 hours and evaporated in vacuo. The residue is taken up in ice water, the mixture extracted with diethyl ether, the extract washed with water and 2 N aqueous sodium carbonate, dried, filtered and evaporated, to yield the 1-[4-(1,2,3,4-tetrahydro-1-naphthyl)-phenyl]-ethyl chloride.

EXAMPLE 2

The mixture of 4.2 g. α-[4 - (1,2,3,4 - tetrahydro-1-naphthyl)-phenyl]-propionitrile, 31 ml. ethylene glycol and 21.4 ml. 50% aqueous sodium hydroxide is refluxed for 24 hours. After cooling, it is diluted with water, washed with diethyl ether, the aqueous layer acidified with concentrated hydrochloric acid and the precipitate formed filtered off and taken up in ethyl acetate. The solution is washed with water and brine, dried, filtered, evaporated and the residue recrystallized from aqueous ethanol, to yield the α - [4 - (1,2,3,4 - tetrahydro - 1-naphthyl)-phenyl]-propionic acid of the formula

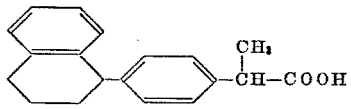

melting at 135–136°.

EXAMPLE 3

To the solution of 10 g. α - [4 - (1,2,3,4-tetrahydro-1-naphthyl)-phenyl]-propionitrile in 275 ml. dimethylformamide, 1.84 g. 56% sodium hydride in mineral oil are added portionwise while stirring. After the hydrogen evolution has ceased, 5.46 g. methyl iodide in 275 ml. toluene are added dropwise during 30 minutes while stirring and coling in an ice bath. The mixture is stirred for 6 hours at room temperature, filtered and the residue washed with benzene. The filtrate is evaporated in vacuo, the residue taken up in water, the mixture extracted with diethyl ether, the extract dried, filtered and evaporated, to yield the α - [4 - (1,2,3,4 - tetrahydro - 1 - naphthyl)-phenyl]-isobutyronitrile of the formula

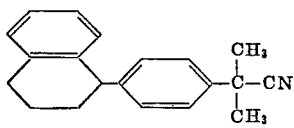

showing in the IR-spectrum a strong band at 2232 cm.$^{-1}$.

EXAMPLE 4

The mixture of 11.6 g. α-[4-(1,2,3,4-tetrahydro-1-naphthyl)-phenyl]-propionitrile, 93 ml. ethylene glycol and 64 ml. 50% aqueous sodium hydroxide is refluxed for 24 hours. It is poured into ice water, the mixture washed with diethyl ether, acidified with concentrated hydrochloric acid and extracted with diethyl ether. The extract is washed with water and brine, filtered, evaporated and the residue recrystallized from aqueous ethanol, to yield the α-[4-(1,2,3,4-tetrahydro-1-naphthyl)-phenyl]-isobutyric acid of the formula

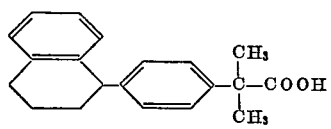

melting at 140–143°.

EXAMPLE 5

The mixture of 23.6 g. 4-(3,4-dihydro-1-naphthyl)-acetophenone, 3.5 g. sulfur, 17.5 ml. morpholine and 0.48 g. p-toluenesulfonic acid is refluxed for 8 hours. After cooling, it is diluted with water, the precipitate formed filtered off, taken up in ethyl acetate and the solution washed with water, aqueous sodium bicarbonate, dried, filtered and evaporated in vacuo, to yield the [4-(3,4-dihydro-1-naphthyl)-phenyl]-thioacetmorpholide of the formula

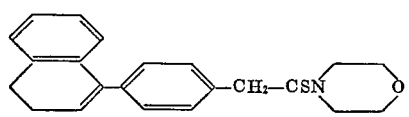

showing in the I.R. spectrum a strong band at 1660 and 1720 cm.$^{-1}$.

The starting material is prepared as follows: The warm solution of 38 g. 1-(4-chlorophenyl)-3,4-dihydronaphthalene in 36 ml. tetrahydrofuran, 0.22 ml. 1,2-dichloroethane and 0.28 ml. methyl iodide is slowly added to the suspension of 4.9 g. magnesium in 20 ml. tetrahydrofuran while stirring under nitrogen. The mixture is refluxed for 20 hours, during which time most of the magnesium has been consumed. After cooling in an ice bath, 5.8 g. acetaldehyde in 28 ml. tetrahydrofuran are added dropwise while stirring and the mixture is refluxed for 1½ hours. It is poured onto ice and concentrated hydrochloric acid, the mixture concentrated in vacuo and the aqueous concentrate extracted with diethyl ether. The extract is washed with water and aqueous sodium bicarbonate, swirled with brine, dried, filtered and evaporated, to yield the 1-[4-(3,4-dihydro-1-naphthyl)-phenyl]-ethanol, showing in the I.R. spectrum a strong band at 3380 cm.$^{-1}$.

To the solution of 40 g. thereof in 90 ml. acetone, the mixture prepared from 10.2 g. chromium trioxide, 14.6 ml. water, 16.3 g. concentrated sulfuric acid and 29 ml. water is added dropwise while stirring at 20–21°. After 3 hours, aqueous sodium bisulfite is added until the color of the mixture changes, the aqueous layer separated, extracted with pentane and the combined organic solutions washed with brine, saturated aqueous sodium bicarbonate, dried, filtered and evaporated in vacuo. The residue is taken up in diethyl ether, the solution washed with 10% aqueous methanol, water, 2 N hydrochloric acid and aqueous sodium bicarbonate, dried, filtered and evaporated, to yield the 4-(3,4-dihydro-1-naphthyl)-acetophenone.

EXAMPLE 6

The mixture of 31.2 g. [4-(3,4-dihydro-1-naphthyl)-phenyl]-thioacetmorpholide, 150 ml. ethylene glycol and 150 ml. 10% aqueous potassium hydroxide is refluxed for 24 hours. After cooling, it is poured into water, the mixture washed with diethyl ether, acidified with concentrated hydrochloric acid and extracted with diethyl ether. The extract is washed with water, swirled with brine, dried, filtered and evaporated in vacuo, to yield the [4-(3,4-dihydro-1-naphthyl)-phenyl] - acetic acid of the formula

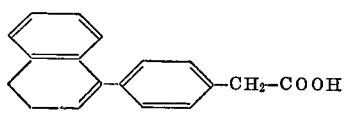

showing in the I.R. spectrum a strong band at 1700 cm.$^{-1}$.

EXAMPLE 7

To the solution of 9.6 g. [4-(3,4-dihydro-1-naphthyl)-phenyl]-acetic acid in 200 ml. ethanol, 50 ml. saturated ethanolic hydrochloric acid are added, the mixture refluxed for 24 hours and evaporated. The residue is taken up in water, the mixture extracted with diethyl ether, the extract washed with water and aqueous sodium bicarbonate, dried, filtered and evaporated in vacuo. The residue is distilled and the fraction boiling at 171–175°/0.2 mm. Hg collected, to yield the ethyl [4-(3,4-dihydro-1-naphthyl)-phenyl]-acetate.

EXAMPLE 8

The solution of 6.1 g. ethyl [4-(3,4-dihydro-1-naphthyl)-phenyl]-acetate in 10 ml. diethyl ether is added dropwise to the gray mixture prepared from 0.53 g. sodium, 83 ml. liquid ammonia and 1 crystal ferric nitrate nonahydrate, while stirring and cooling with Dry Ice. After 20 minutes, 3.3 g. methyl iodide in 10 ml. diethyl ether are added during 5 minutes and the mixture stirred for 3 hours. Hereupon 1.3 g. ammonium chloride are added, followed by 36 ml. diethyl ether and the mixture is stirred at room temperature until all ammonia is evaporated. It is diluted with diethyl ether, 36 ml. 2 N hydrochloric acid are added dropwise and the organic solution separated. It is washed with water and aqueous sodium bicarbonate, dried, filtered and evaporated in vacuo. The residue is distilled and the fraction boiling at 165–175°/0.2 mm. Hg collected, to yield the ethyl α-[4-(3,4-dihydro - 1 - naphthyl)-phenyl]-propionate of the formula

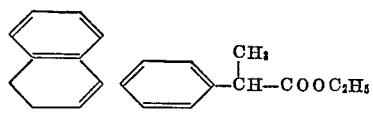

EXAMPLE 9

The mixture of 8 g. 1-[4-(7-chloro-1,2,3,4-tetrahydro-1-naphthyl)-phenyl]-ethyl chloride, 20 ml. dimethylsulfoxide and 1.29 g. sodium cyanide is stirred for 8 hours at 70–75°. After cooling, it is poured into water, the mixture extracted with diethyl ether, the extract washed with water and brine, dried, filtered and evaporated. The residue is distilled and the fraction boiling at 205–208°/0.25 mm. Hg collected, to yield the α-[4-(7-chloro-1,2,3,4- tetrahydro-1-naphthyl)-phenyl]-propionitrile of the formula

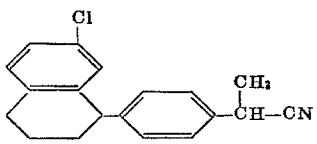

The starting material is prepared as follows: The solution of 31.2 g. bromobenzene in 140 ml. diethyl ether is added dropwise to the suspension of 4.8 g. magnesium in 140 ml. diethyl ether while stirring and the mixture is refluxed for one hour, after which time a very small amount of magnesium remains. It is cooled with an ice bath, 26.5 g. 7-chloro-α-tetralone in 140 ml. benzene are added in a slow stream and the mixture refluxed for 5 hours. It is poured onto ice and concentrated hydrochloric acid, the mixture extracted with diethyl ether, the extract washed with water and brine, dried, filtered and evaporated in vacuo. The residue is taken up in 300 ml. concentrated hydrochloric acid, the suspension refluxed for one hour, cooled, filtered and the residue recrystallized from aqueous ethanol, to yield the 7-chloro-1-phenyl-3,4-dihydronaphthalene melting at 66–68°.

20.7 g. thereof are hydrogenated in 250 ml. glacial acetic acid over 1.3 g. 10% palladium on charcoal at 3 atm. After the uptake of the theoretical amount of hydrogen the mixture is filtered and the filtrate evaporated in vacuo. The residue is taken up in water, the mixture extracted with diethyl ether, the extract washed with water and aqueous sodium bicarbonate, dried, filtered, evaporated, the residue distilled and the fraction boiling at 152–170°/0.25 mm. Hg collected, to yield the 7-chloro-1-phenyl-1,2,3,4-tetrahydronaphthalene.

The mixture of 18.6 g. thereof, 6.85 ml. acetyl chloride and 15.5 ml. carbon disulfide is added dropwise during 45 minutes to the stirred suspension of 11.5 g. anhydrous aluminum chloride in 95 ml. carbon disulfide. Stirring is continued for 2 hours at room temperature and the mixture poured into ice water. It is heated to evaporate the carbon disulfide, cooled, extracted with diethyl ether, the extract washed with water and aqueous sodium bicarbonate, dried, filtered and evaporated in vacuo. The residue is distilled, the fraction boiling at 175–185°/0.15 mm. Hg collected, triturated with petroleum ether and recrystallized from hexane, to yield the 4-(7-chloro-1,2,3,4-tetrahydro-1-naphthyl)-acetophenone, melting at 85–87°.

To the solution of 7.5 g. thereof in 26 ml. ethanol and 13 ml. tetrahydrofuran, 1 g. sodium borohydride is added portionwise while stirring and cooling in an ice bath. After 4 hours a few drops acetic acid are added, the mixture evaporated in vacuo and the residue taken up in water. The mixture is extracted with diethyl ether, the extract washed with aqueous sodium bicarbonate, dried and evaporated, to yield the 1-[4-(7-chloro-1,2,3,4-tetrahydro-1-naphthyl)-phenyl]-ethanol, showing in the I.R. spectrum a strong band at 3350 cm.$^{-1}$.

The mixture of 7.4 g. thereof, 54 ml. benzene and 15.1 ml. thionyl chloride is refluxed for 6 hours and evaporated in vacuo. The residue is taken up in water, the mixture extracted with diethyl ether, the extract washed with water and aqueous sodium bicarbonate, dried, filtered and evaporated, to yield the 1-[4-(7-chloro-1,2,3,4-tetrahydro-1-naphthyl)-phenyl]-ethyl chloride.

EXAMPLE 10

The mixture of 4 g. α-[4-(7-chloro-1,2,3,4-tetrahydro-1-naphthyl)-phenyl]-propionitrile, 14 ml. ethylene glycol and 13 ml. 50% aqueous sodium hydroxide is refluxed for 24 hours and poured into 400 ml. water. The filtrate is cooled in an ice bath, acidified with concentrated hydrochloric acid and extracted with diethyl ether. The extract is washed with water and brine, dried, filtered and evaporated in vacuo. The residue is taken up in diethyl ether, the solution extracted with aqueous sodium bicarbonate, the aqueous layer washed with diethyl ether and acidified with hydrochloric acid. The mixture is extracted with diethyl ether, the extract washed with water and brine, dried, filtered and evaporated, to yield the α-[4-(7-chloro-1,2,3,4-tetrahydro-1-naphthyl)-phenyl]-propionic acid of the formula

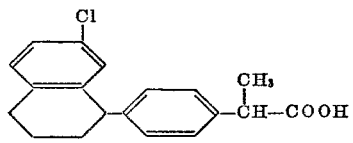

showing in the I.R. spectrum bands at 807, 852 and 1705 cm.$^{-1}$.

EXAMPLE 11

Preparation of 10,000 tablets each containing 100.0 mg. of the active ingredient:

Formula

| | G. |
|---|---|
| α-[4-(1,2,3,4-tetrahydro-1-naphthyl)-phenyl]-isobutyric acid | 1,000.00 |
| Lactose | 2,535.00 |
| Corn starch | 125.00 |
| Polyethylene glycol 6,000 | 150.00 |
| Talcum powder | 150.00 |
| Magnesium stearate | 40.00 |
| Purified water | Q.s. |

Procedure

All the powders are passed through a screen with openings of 0.6 mm. Then the drug substance, lactose, talcum, magnesium stearate and half of the starch are mixed in a suitable mixer. The other half of the starch is suspended in 65 ml. water and the suspension added to the boiling solution of the polyethylene glycol in 260 ml. water. The paste formed is added to the powders which are granulated, if necessary, with an additional amount of water. The granulate is dried overnight at 35°, broken on a screen with 1.2 mm. openings and compressed into tablets using concave punches with 10.3 mm. diameter, uppers bisected.

EXAMPLE 12

To the solution of 7.2 g. α-[4-(1,2,3,4-tetrahydro-1-naphthyl)-phenyl]-isobutyric acid in 130 ml. diethyl ether, 4.3 g. l-α-(1-naphthyl)-ethylamine are added while stirring and the precipitate formed filtered off. It is recrystallized several times from acetone, to yield the corresponding salt melting at 184–185°. It is suspended in 2 N sulfuric acid, the mixture extracted with diethyl ether, the extract washed with 2 N sulfuric acid, water and brine, dried, filtered and evaporated. The residue is recrystallized from aqueous ethanol, to yield the l-α-[4-(1,2,3,4-tetrahydro-1-naphthyl)-phenyl]-isobutyric acid, melting at 136–137° and having an $[\alpha]_D^{25} = -66.8°$ (in methanol).

In the analogous manner, the salt of the d-α-(1-naphthyl)-ethylamine is prepared, M.P. 181–183°, from which the d-α-[4-(1,2,3,4-tetrahydro-1-naphthyl)-phenyl]-isobutyric acid is liberated, melting at 132–134° and having an $[\alpha]_D^{25} = +64.4°$.

EXAMPLE 13

The solution of 5 g. [2-methoxy-4-(1,2,3,4-tetrahydro-1-naphthyl)-phenyl]acetaldehyde in 30 ml. benzene is added dropwise to the black suspension prepared from the concentrated aqueous solution of 10 g. silver nitrate and 2 N aqueous sodium hydroxide, at 90–95° while stirring and refluxing. The mixture is filtered hot, the residue washed with benzene, the filtrate acidified with oxalic acid, separated and the aqueous phase washed with benzene. The combined organic solution is washed with water and brine, dried, filtered, evaporated, the residue distilled and the fraction boiling at 200–205°/0.2 mm. Hg collected, to yield the [2-methoxy-4-(1,2,3,4-tetrahydro-1-naphthyl)-phenyl]-acetic acid of the formula

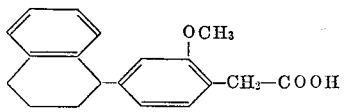

showing in the I.R. spectrum bands at 1260 and 1705 cm.$^{-1}$.

The starting material is prepared as follows: The mixture of 22.4 g. 4-(1,2,3,4-tetrahydro-1-naphthyl)-phenol, 2.3 g. sodium and 400 ml. xylene is refluxed for 2 hours while stirring. It is cooled to room temperature, 12.1 g. allyl bromide in 50 ml. xylene are added dropwise and refluxing is continued for 6 hours. It is evaporated in vacuo, the residue taken up in water, the mixture extracted with diethyl ether, the extract washed with water, dried, filtered, evaporated and the residue recrystallized from hexane-pentane, to yield the 2-allyl-5-(1,2,3,4-tetrahydro-1-naphthyl)-phenol melting at 75–77°.

To the solution of 13.2 g. thereof in 100 ml. dimethylformamide-toluene (1:1), 2.3 g. 56% sodium hydride in mineral oil are added portionwise while stirring, followed by 8 g. methyl iodide. After stirring for 2 hours at room temperature, the mixture is diluted with diethyl ether, filtered and the filtrate concentrated in vacuo to about 20 ml. The concentrate is diluted with ethyl acetate, washed with brine, dried and filtered. The filtrate is cooled with an ice salt mixture and 1.5 liter air containing 2% ozone are bubbled through while stirring. The mixture is allowed to warm up to room temperature, 50 ml. acetic acid are added followed by small portions of 5 g. zinc powder while stirring at 50°. The mixture is filtered, the filtrate concentrated, the concentrate diluted with 500 ml. water and the mixture extracted with benzene. The extract is washed with water and brine, dried, filtered and evaporated, to yield the [2-methoxy-4-(1,2,3,4-tetrahydro-1-naphthyl)-phenyl]-acetaldehyde.

I claim:
1. A pharmaceutical composition comprising a hypocholesterolemically or anti-inflammatory effective amount of a compound of the formula

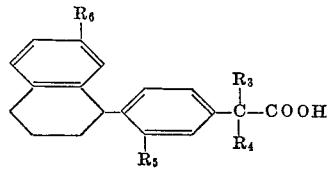

wherein $R_3$ is hydrogen or alkyl with up to 4 carbon atoms, $R_4$ is hydrogen, alkyl or cycloalkyl with up to 4 carbon atoms, and each of $R_5$ and $R_6$ is hydrogen, fluoro, chloro or trifluoromethyl; the 1,2-dehydro derivative or the ammonium, or alkali metal salt thereof.

2. A composition as claimed in claim 1, wherein the effective compound is the α-[4-(1,2,3,4-tetrahydro-1-naphthyl)-phenyl]-isobutyric acid, 1,2-dehydro derivative or the ammonium, sodium or potassium salt thereof.

References Cited

UNITED STATES PATENTS

| | | | |
|---|---|---|---|
| 3,277,106 | 10/1966 | Bencze et al. | 424—317 |
| 3,385,886 | 5/1968 | Nicholson et al. | 260—515 R |
| 3,466,372 | 9/1969 | Shen et al. | 424—317 |
| 3,565,904 | 2/1971 | Juby et al. | 424—317 |

JEROME D. GOLDBERG, Primary Examiner

V. D. TURNER, Assistant Examiner

U.S. Cl. X.R.

260—243 B, 247.2 R, 268 BC, 293.62, 326.3, 470, 471 A, 473, 518 R, 551 S, 558 A, 558 P, 558 T, 558 R, 559 R; 424—324